UNITED STATES PATENT OFFICE.

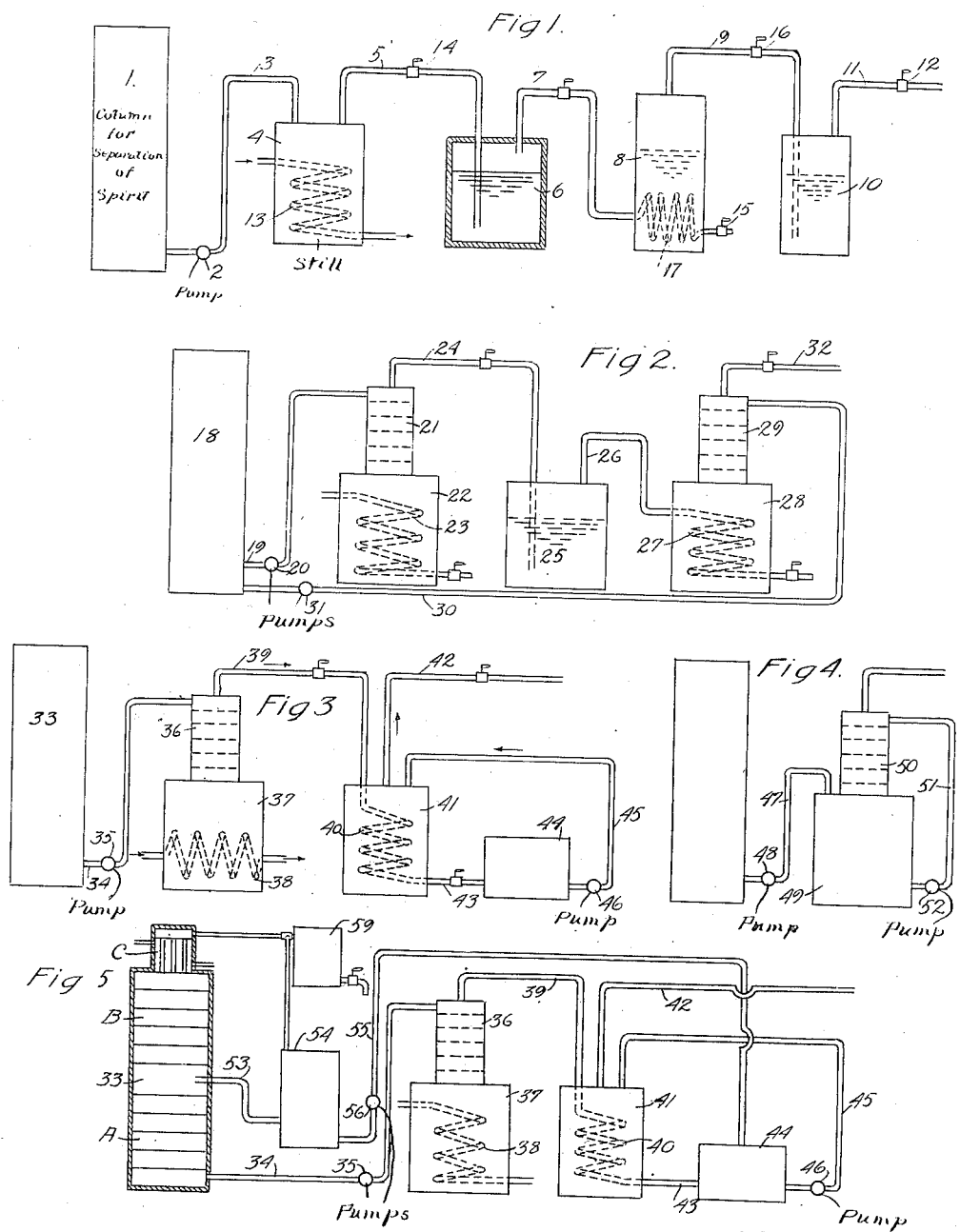

HILDING OLOF VIDAR BERGSTRÖM, OF STOCKHOLM, SWEDEN.

METHOD OF DISTILLING PYROLIGNEOUS ACID 1,261,344.        Specification of Letters Patent.        Patented Apr. 2, 1918.

Application filed June 19, 1917. Serial No. 175,631.

*To all whom it may concern:*

Be it known that I, HILDING OLOF VIDAR BERGSTRÖM, a subject of the King of Sweden, and resident of 5 Baldersgatan, Stockholm, Sweden, have invented certain new and useful Improvements in the Methods of Distilling Pyroligneous Acid, of which the following is a specification.

In the dry distillation of wood or other substance containing cellulose, so called pyroligneous acid is obtained which principally contains water, acetic acid, wood spirit and tar or tarry constituents dissolved in the pyroligneous acid. The acetic acid is generally recovered in the form of acetate of lime (so called "graukalk") and in order to obtain an acetate containing a high percentage of $Ca(OCOCH_3)_2$ the pyroligneous acid is preferably distilled and the distillate is saturated with lime and evaporated.

My present invention now refers to a method of distilling pyroligneous acid which is rendered more economical than the previous methods due to the utilization of the distillation vapors.

The characteristic feature of my invention consists in executing the whole process under superatmospheric pressure in the system of apparatus. Consequently, the distillation of the pyroligneous acid is performed under an increased pressure, say 2-4 atmospheres, in the distillation boiler, the vapors formed during the distillation are led also under an increased pressure into lime white or other substance adapted for binding the acid constituents of the same, and the resulting vapors are also held under an increased pressure when utilized for heating purposes, for example for distilling pyroligneous acid, for depriving the same of spirit, for drying the acetate obtained, etc.

Another feature of the invention consists in passing the vapors from the distillation of the pyroligneous acid through liquid pyroligneous acid (crude or deprived of spirit) before being led into the lime white or other substance adapted for binding the acid constituents of the same. By this means the tar or tarry constituents are removed from the vapors before they are led into the lime white and, consequently, a purer acetate is formed.

Another feature of the invention consists in that the vapors, washed with pyroligneous acid or not, instead of being directly led into lime white or the like, are led into a heating element surrounded by acetate solution or other liquid which is to be concentrated. The vapors are condensed in said heating element and the condensate is then saturated with lime or other base for forming acetate solution. In passing through the said heating element the vapors give off their heat to the solution or liquid surrounding the same, said solution being thereby brought to boiling and is, thus, concentrated. The vapors escaping from the boiling solution or liquid may still be maintained under an increased pressure and be utilized for heating purposes as stated above.

Another feature of my invention consists in using acetate solution instead of water for slaking the lime in order to obtain the lime white necessary for neutralizing the acid constituents of the vapors either in the state of vapors or after having been condensed.

Another feature of the invention consists in an improved method of obtaining the acetate solution which is based on the following observations. The pyroligneous acid is generally deprived of wood spirit in a column apparatus before the acetic acid and other acid constituents are distilled off. A column apparatus used for such purposes consists, as is well known, of a vaporizing compartment where the volatile constituents (spirit) are vaporized by means of steam and from the lower part of which the solution deprived of spirit is drawn off, the concentration compartment where the vapors from the vaporizing compartment are concentrated, the dephlegmator where the vapors are partly condensed so as to form a return liquid necessary for the concentration, and a cooler in which the vapors not condensed in the dephlegmator are condensed.

Hitherto, the return liquid has been allowed to stream down from the concentration compartment into the vaporizing compartment. This return liquid, which has once been distilled off and, thus, become deprived of its impurities, is according to the old method again mixed with the impure liquid in the vaporizing compartment.

In such cases where the liquid having been deprived of spirit is to be re-distilled for removing impurities, the said return liquid having been mixed with the impure liquid is, thus, also distilled once more, and as this return liquid represents a considerable quantity, often about ¼ of the total amount of liquid introduced into the column apparatus, the re-distillation of the same is a loss from an economical point of view.

According to the last-mentioned feature of my present invention the return liquid from the dephlegmator is, therefore, prevented from streaming back into the vaporizing compartment and is for this purpose taken out from the concentrating compartment and led into a secondary column apparatus in which the spirit is driven off by means of steam. The resulting liquid from the last mentioned column apparatus may then be directly saturated with lime for obtaining calcium acetate which may be used for the above purposes.

In the accompanying drawings, Figures 1 to 5 show diagrammatically five different forms of apparatus in which the process may be carried out, but the invention is not restricted to the use of such apparatus.

The invention is more particularly described in the following specification with reference to the accompanying drawing.

Example 1: Supposing that the pyroligneous acid has previously been deprived of spirit, that the distillation vapors of the same are led directly into lime white and that the unabsorbed vapors are utilized for distilling pyroligneous acid in the next distillation boiler of a battery adapted for so called series distillation. Fig. 1 schematically illustrates an apparatus for executing this process.

1 is an ordinary column apparatus in which the pyroligneous acid is deprived of spirit. By means of a pump 2 located in the conduit 3 pyroligneous acid is led into the distillation boiler 4 which is heated by means of steam led through a coil 13. From the distillation boiler 4 the vapors are led through conduit 5 into the receptacle 6 containing lime white or other base which binds the acid constituents (principally acetic acid) of the vapors so as to form acetate solution. The resulting vapors are led through conduit 7 into the heating coil 17 of the next distilling boiler 8. The distillation vapors from the latter are led through conduit 9 into lime white contained in the receptacle 10. The resulting vapors not absorbed by the lime white are led off through conduit 11 and may, if desired, be utilized for any heating purpose.

The characteristic feature of the invention consists, as mentioned above, in maintaining a pressure higher than the atmospheric pressure in the whole process in order that the vapors escaping during different phases of the same may be utilized for heating purposes. Consequently, the distillation in the boiler 4 is executed at an increased pressure, and the vapors led off from the receptacle 6 through the conduit 7 are also maintained at an increased pressure and so on. This result is obtained by locating regulating valves 12, 14, 15, 16 in the different conduits.

Example 2: Again supposing that the pyroligneous acid has previously been deprived of spirit, that the distillation vapors of the same are led directly into lime white and that the unabsorbed vapors are utilized for distilling pyroligneous acid in the next distillation boiler of a battery adapted for so called series distillation, and that the distillation vapors are washed with pyroligneous acid before being led into lime white. Fig. 2 schematically shows an apparatus adapted for this purpose.

18 is a column apparatus in which the pyroligneous acid is deprived of spirit by means of steam. Through conduit 19 the acid is by means of a pump 20 pumped into a column apparatus 21 combined with the boiler 22 which is indirectly heated by steam passing through the coil 23. It is not necessary that all the pyroligneous acid from the column 18 is introduced into the boiler 22 through the column 21 but one portion of the same may also be introduced directly into said boiler. The vapors evolved in the boiler 22 pass through the column 21 in opposite direction to the pyroligneous acid and are thereby washed from tar and other impurities. They continue through the conduit 24 into the receptacle 25 containing lime white which absorbs the acid constituents. From the receptacle 25 the resulting unabsorbed vapors continue through the conduit 26 and the coil 27 located within the boiler 28. This boiler is also combined with a column apparatus 29 to which pyroligneous acid may be led from the column apparatus 18 through the conduit 30 by means of the pump 31. The vapors from the boiler 28 and column 29 are led off through the conduit 32 and may be utilized for any desired purpose.

Example 3: Supposing pyroligneous acid deprived of spirit be used, that the distillation vapors are washed by pyroligneous acid and afterward led through a heating element surrounded by acetate solution. Fig. 3 schematically shows an apparatus adapted for this form of the process.

In the column apparatus 33 the crude pyroligneous acid is deprived of spirit and then led through the conduit 34 by the pump 35 into the column apparatus 36 from which it streams down into the boiler 37 which is heated indirectly by means of steam led through the coil 38. The vapors from the boiler 37 which are in the column 36 washed with pyroligneous acid are led through tube 39 into the heating element 40 located within the receptacle 41 containing acetate solution. In said heating element the vapors are condensed and give off their heat to the acetate solution which is brought to boil and, thus, concentrated. The condensate is led from the heating element 40 through conduit 43 into the receptacle 44 where it is saturated with lime so as to form acetate solution. The latter is then brought over into the receptacle through conduit 45 by the pump 46. The vapors from the receptacle 41 are led off through conduit 42 and may be utilized for any heating purpose. They may for example be led through the heating coil of the next distilling boiler (not shown) in the battery, or be utilized in an apparatus for drying acetate, or they may be utilized as heating steam in the column apparatus 33.

Instead of using pyroligneous acid which has previously been deprived of spirit, one may also employ crude pyroligneous acid which is then wholly or partially pumped into the column apparatus combined with the distillation boiler or boilers.

Instead of introducing the pyroligneous acid into the column apparatus (21, Fig. 2, 36, Fig. 3) combined with the boiler it may, as shown in Fig. 4, be pumped directly into the boiler 49 through the conduit 47 by means of the pump 48, and then the desired quantity of acid may be supplied to the column apparatus 50 from the bottom of the boiler through the conduit 51 by means of the pump 52.

In the above examples it is of course not necessary to introduce the liquid by means of pumps into the boilers, but it may be introduced in any convenient manner.

Example 4: This example will illustrate the above mentioned form of the invention according to which the return liquid is taken out from the concentrating compartment of the column apparatus and led into a secondary column apparatus where the spirit is driven off. The liquid deprived of spirit and principally consisting of acetic acid is then saturated with lime white or other base in order to obtain acetic solution. Fig. 5 schematically illustrates an apparatus adapted for this purpose. With the exception of the secondary column and the parts belonging to the same this apparatus is arranged as in Fig. 3 and corresponding parts are designated as in said figure. In the column apparatus 33 the vaporizing compartment is designated by A, the concentrating compartment by B and the dephlegmator by C. The return liquid from the dephlegmator C streams down through the concentrating compartment B, from which it is drawn off through the conduit 53 and is led into the secondary column 54, where the spirit is driven off by means of steam. The spirit vapor may be led from the column 54 into the cooler 59 together with the vapors from the dephlegmator C. By taking out the return liquid from the contrating compartment B, it is thus prevented from being mixed with the impure liquid in the vaporizing compartment A which is to be distilled in the boiler 37. From the column 54 the liquid deprived of spirit is through the conduit 55 by means of the pump 56 led into the receptacle 44 where it is saturated with lime white so as to form acetate solution.

For slaking the lime in order to obtain lime white one may, as stated above, utilize acetate solution obtained in the process. This solution can be taken out from the receptacle 44 (Fig. 3), from the receptacles 6 or 10 (Fig. 1) or in a concentrated form from the receptacle 41 (Fig. 3).

In the above examples the pressure in the first boiler (4, 22) ought to be higher than in the second boiler (8, 28). The pressure in the boiler 37 must also be higher than in the receptacle 41. If one for one reason or the other wants to maintain a high difference of temperature between the vapors in the heating element 40 and the surrounding acetate solution a vacuum can be maintained within the receptacle. Such a vacuum must always be maintained if the distillation in the boiler 37 is carried out at ordinary pressure.

It is to be understood that the invention is not limited to the above described examples. Several modifications and improvements may therefore be made within the scope of the invention. It is for example not necessary to use column apparatus for washing the distillation vapors with pyroligneous acid. One may also use for this purpose ordinary scrubbers or any other convenient apparatus. It is not necessary that the column apparatus are directly combined with the boilers, although this is to be preferred. A heating element, surrounded by acetate solution, can also be used in the case that the distillation vapors are not first passed through pyroligneous acid.

In this connection it may be mentioned that in the Example 4 the best results are obtained if the crude pyroligneous acid is introduced into the vaporizing compartment A as near its boiling point as possible and that the wood spirit taken out from the concentrating compartment B is relatively concentrated.

The term "heating element" is used as a generic expression for one or several heating elements located in one or several receptacles.

Having now described my invention, what I claim as new and desire to secure by Letters Patent is:

1. The herein described improvement in distilling pyroligneous acid which comprises performing the distillation under superatmospheric pressure, leading the vapors from the distillation, while under superatmospheric pressure into an agent capable of absorbing and neutralizing the acid constituents thereof, and transferring heat from the remaining vapors while still under superatmospheric pressure, to any of the liquors in the process.

2. The improvement in the art of distilling pyroligneous acid, which comprises distilling the pyroligneous acid under superatmospheric pressure, passing the vapors from the distilling operation through pyroligneous acid, leading the resulting vapors under superatmospheric pressure into an alkaline absorbent, and effecting a transfer of heat from the remaining vapors, while still under superatmospheric pressure, to any of the liquors in the process.

3. The improvement in the art of treating pyroligneous acid, which comprises distilling the same under superatmospheric pressure, leading the vapors thereby produced, while still under superatmospheric pressure, into a heating device surrounded by a liquid to be evaporated, leading off the vapors from such liquid being evaporated, while said vapors are under superatmospheric pressure, effecting a transfer of heat from said last mentioned vapors while still under superatmospheric pressure to any liquors in the process, and neutralizing the condensate formed in said heating device with an alkaline reagent.

4. An improvement in the art of distilling pyroligneous acid, said improvement comprising distilling the same under superatmospheric pressure, passing the resulting vapors through pyroligneous acid, leading the resulting vapors under superatmospheric pressure into a heating device surrounded by a liquid to be evaporated and thereby boiling said liquid, leading off the vapors from such liquid under superatmospheric pressure and effecting a transfer of heat between such vapors under superatmospheric pressure and any liquors in the process, and neutralizing the condensate formed in said heating element with an alkaline regent.

5. The improvement in the art of distilling pyroligneous acid, consisting in driving off wood spirit in a column apparatus, leading the pyroligneous acid through a column into a boiler, distilling said acid in said boiler under superatmospheric pressure, passing the vapors of distillation through said column in opposite direction to the acid, leading said vapors under superatmospheric pressure into lime white, leading the resulting vapors through the heating coil of a second boiler for distilling pyroligneous acid, passing the distillation vapors through a column combined with said boiler in opposite direction to pyroligneous acid, and effecting a transfer of heat from the remaining vapors to any liquor used in the process.

6. The improvement in the art of distilling pyroligneous acid, consisting in driving off wood spirit in a column apparatus, leading the pyroligneous acid deprived of spirit through a column into a boiler, distilling said acid in said boiler under superatmospheric pressure, passing the distillation vapors through the pyroligneous acid in said column, leading said vapors into a heating device surrounded by acetate solution under superatmospheric pressure to be concentrated, and saturating the condensate formed in said heating element with lime white for obtaining acetate of lime.

7. In the herein described method of distilling pyroligneous acid, slaking lime for obtaining lime white with acetate solution obtained in the process.

8. In distilling pyroligneous acid, the improvement which comprises driving off wood spirit in a column apparatus, taking out the return liquid from the concentrating compartment, leading it into a secondary column apparatus, driving off wood spirit in said secondary column apparatus by means of steam, saturating the liquid thus deprived of spirit with lime so as to obtain acetate solution, distilling under superatmospheric pressure the impure pyroligneous acid taken out from the vaporizing compartment of the first mentioned column apparatus, leading the distillation vapors under superatmospheric pressure through pyroligneous acid and into a heating element surrounded by acetate solution contained in a receptacle, saturating the condensate from said heating element with lime white, leading off the vapors from said receptacle under superatmospheric pressure, for heating purposes.

9. In distilling pyroligneous acid, driving off wood spirit in a column apparatus, taking out the return liquid from the concentrating compartment, leading it into a secondary column apparatus driving off wood spirit in the said column apparatus by means of steam, saturating the liquid thus deprived of spirit with lime so as to obtain acetate solution, distilling under superatmospheric pressure the impure pyroligneous acid taken out from the vaporizing compartment of the first mentioned column apparatus, leading the distillation vapors under superatmospheric pressure through pyroligneous acid and into an agent adapted to combine with the acid constituents, leading the resulting vapors under superatmospheric pressure into the heating coil of another distillation boiler, distilling pyroligneous acid in said boiler under superatmospheric pressure, leading off the distillation vapors under such pressure through pyroligneous acid into an agent adapted to combine with acid constituents and thereby producing vapors under superatmospheric pressure suitable for heating purposes.

In witness whereof I have hereunto set my hand.

HILDING OLOF VIDAR BERGSTRÖM.

Copies of this patent may be obtained for five cents each, by addressing the "Commissioner of Patents, Washington, D. C."